United States Patent [19]

Baur

[11] Patent Number: 5,751,453
[45] Date of Patent: May 12, 1998

[54] LIQUID CRYSTAL DISPLAY WITH PEN-INPUT CAPABILITY

[75] Inventor: Peter F. Baur, Augsberg, Germany

[73] Assignee: NCR Corporation, Dayton, Ohio

[21] Appl. No.: 553,741

[22] Filed: Oct. 23, 1995

Related U.S. Application Data

[63] Continuation of Ser. No. 322,969, Oct. 13, 1994, abandoned, which is a continuation of Ser. No. 44,788, Apr. 9, 1993, abandoned, and a continuation-in-part of Ser. No. 805,450, Dec. 6, 1991, Pat. No. 5,243,452.

[51] Int. Cl.$^6$ .............................. G02F 1/1343; G02F 1/13
[52] U.S. Cl. .................... 359/60; 359/43; 359/55
[58] Field of Search .................... 359/43, 45, 55, 359/60, 84, 85; 340/706, 707, 708, 784

[56] References Cited

U.S. PATENT DOCUMENTS

| | | | |
|---|---|---|---|
| 4,185,165 | 1/1980 | Fenel | 178/19 |
| 4,345,248 | 8/1982 | Togashi et al. | 340/784 |
| 4,430,648 | 2/1984 | Togashi et al. | 340/784 |
| 4,456,787 | 6/1984 | Schlosser et al. | 178/19 |
| 4,516,112 | 5/1985 | Chen | 340/365 R |
| 4,583,087 | 4/1986 | Van de Venne | 359/60 |
| 4,644,102 | 2/1987 | Blesser et al. | 178/19 |
| 4,715,685 | 12/1987 | Yaniv et al. | 359/60 |
| 4,719,457 | 1/1988 | Kitajima et al. | 359/55 |
| 4,723,836 | 2/1988 | Kono et al. | 359/85 |
| 4,730,186 | 3/1988 | Koga et al. | 340/784 |
| 4,736,073 | 4/1988 | Abernethy | 178/19 |
| 4,767,192 | 8/1988 | Chang et al. | 359/72 |
| 4,814,760 | 3/1989 | Johnston et al. | 340/784 |
| 4,825,202 | 4/1989 | Dijon et al. | 340/752 |
| 4,859,814 | 8/1989 | Sciacero et al. | 178/19 |
| 4,980,646 | 12/1990 | Zemel | 324/716 |
| 5,008,497 | 4/1991 | Asher | 178/18 |
| 5,064,275 | 11/1991 | Tsunoda et al. | 359/58 |
| 5,136,125 | 8/1992 | Russell | 178/19 |
| 5,218,174 | 6/1993 | Gray et al. | 178/19 |
| 5,241,308 | 8/1993 | Young | 341/34 |
| 5,243,452 | 9/1993 | Baur | 359/60 |

*Primary Examiner*—William L. Sikes
*Assistant Examiner*—Huy Mai
*Attorney, Agent, or Firm*—Gregory A. Welte

[57] ABSTRACT

In a liquid-crystal display, each pixel is associated with a sensor which detects incoming light projected by a light pen. In response to the detected light, the sensor produces a signal which causes its associated pixel to darken. Thus, as a user moves the light pen along the display, the pen leaves a trail of darkened pixels, analogous to a pen leaving a trail of ink on paper.

11 Claims, 9 Drawing Sheets

FIG. 1

MOLECULES

FIG. 2A  FIG. 2B  FIG. 2C

$E < E_C$   $E \geq E_C$   $E \gg E_C$

LIQUID CRYSTAL DISPLAY WITH PEN-INPUT CAPABILITY

This is a continuation of application Ser. No. 08/322,969, filed on Oct. 13, 1994, now abandoned which is a continuation of application Ser. No. 08/044,788 filed on Apr. 9, 1993, now abandoned, and a continuation-in-part of Ser. No. 07/805,450, filed Dec. 6, 1991, entitled "Liquid Crystal Display with Pen-Input Capability," now U.S. Pat. No. 5,243,452.

CROSS-REFERENCE TO RELATED APPLICATIONS

This application is related to:

application Ser. No. 07/995,403, entitled "Video RAM in Computer," by Peter F. Baur, filed on Dec. 18, 1992, and assigned to NCR Corporation; and application Ser. No. 08/038,367, entitled "Pen Input to Liquid Crystal Display," by Peter F. Baur, filed on Mar. 29, 1993, and assigned to NCR Corporation.

The invention concerns a computer display which draws a line which follows a light pen moving along the display, thus mimicking a line drawn by a pen on paper.

BACKGROUND OF THE INVENTION

Figure 1:
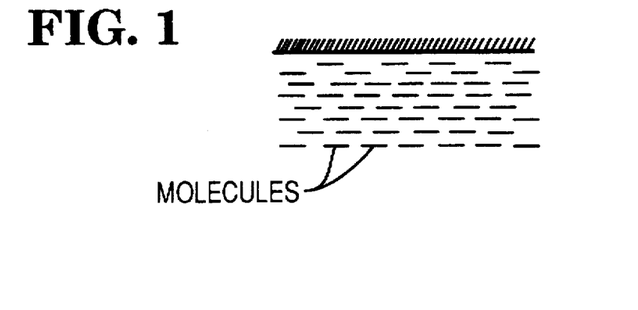
FIG. 1 illustrates the rod-like nature of the molecules in a liquid crystal.

A liquid crystal display (LCD) includes a liquid crystal sandwiched between two transparent sheets. The liquid crystal is composed of long, rod-like, polarized molecules, as shown in FIG. 1. In the absence of an electric field E, the molecules tend to align themselves with each other, as in FIG. 2A. When a field E is applied, which exceeds $E_c$ as indicated, the molecules, being electrically polarized, align themselves with the field, as in FIG. 2B. When the field is increased, the molecules further align as in FIG. 2C.

Figure 3A:
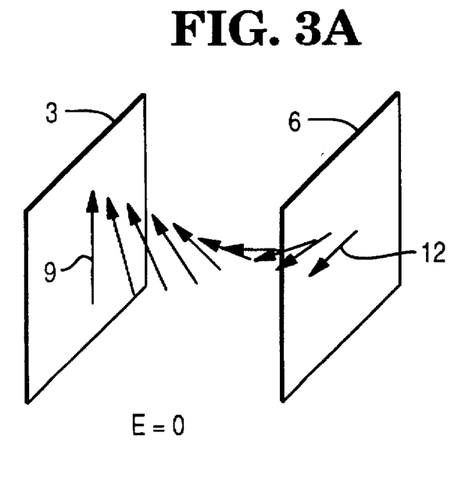
FIG. 3A illustrates a "twisted" liquid crystal cell.

This tendency to align with an electric field can be used to modulate light, as will be explained by reference to FIGS. 3 and 4. FIG. 3A shows a "twisted nemetic cell." ("Nemetic" is one type of liquid crystal. Two others are "cholesteric" and "smectic.") The molecules can be divided into two types, namely, "body" molecules (ie, those located within the body of the liquid, away from the surface) and "surface" molecules (ie, those at the surface of the body and near the faces of the cell).

The surface molecules are adjacent the faces of the cell, such as faces 3 and 6. These faces are specially treated, in a manner known in the art, in order to induce the surface molecules to align in specific directions. That is, in FIG. 3A, the treatment of face 3 induces the surface molecules 9 to align vertically. The treatment of face 6 induces the surface molecules 12 to align horizontally.

In the absence of an electric field (E-0, as indicated), all molecules (body and surface) tend to align with their neighbor molecules. However, because the surface molecules (at faces 3 and 6) already have an alignment imposed by the treated faces, they induce the body molecules to align with them. Further, since the surface molecules at face 3 are perpendicular to those at face 6, the body molecules must make the transition from vertical alignment (at face 3) to horizontal alignment (at face 6). They do this by forming the "twisted" arrangement shown.

Figure 3B:
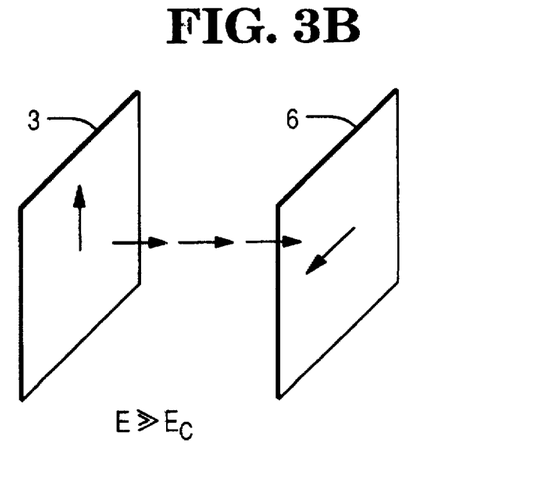
FIG. 3B illustrates how the molecules in a "twisted" liquid crystal cell re-orient themselves in the present of an electric field.

When an electric field is applied which greatly exceeds the critical field (ie, $E>>E_c$ as indicated), the body molecules change alignment; they now align themselves with the field instead of with the surface molecules, as shown in FIG. 3B.

Figure 4:
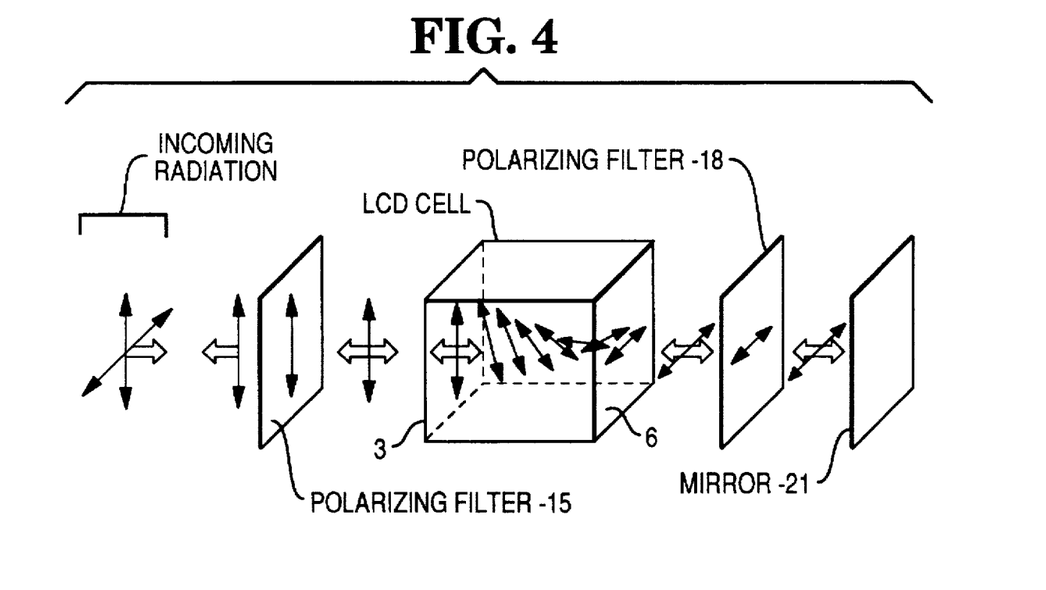
FIG. 4 illustrates a single cell in a liquid crystal display.

The apparatus of FIG. 3 can be used to construct one type of LCD, namely, the "reflective" type, as shown in FIG. 4. Unpolarized incoming radiation, such as interior room light, passes through a polarizing filter 15 and becomes polarized. The direction of polarization is parallel to the molecules at face 3 of the cell, and thus the polarized light is allowed to enter the cell. As the polarized light progresses through the cell, the direction of polarization gradually changes, following the direction of the "twisted" molecules. That is, the "twisted" molecules cause the polarization vector of the light to rotate as the light propagates through the cell. When the polarized light reaches face 6, it has rotated ninety degrees, and its polarization vector is now parallel with the molecules at the second face 6. The light exits the second face 6, passes through a second polarizing filter 18, perpendicular to the first, and is reflected by a mirror 21.

After reflection, the light retraces its steps. It again rotates ninety degrees as it passes through the cell, and exits through the first polarizing filter. Thus, ignoring attenuation occurring within the filters and the cell, the light appears to have been reflected by the mirror 21. The cell looks bright.

If an electric field is applied to the cell, the molecules align as shown in FIG. 3B. The "twisting" disappears, removing the ninety-degree rotation of light within the cell. With the rotation absent, the second polarizing filter 18 blocks transmission of the light, because the light reaching it has the wrong polarization for transmission through it. There is no reflection by the mirror 21, and the cell appears dark.

Other types of LCD cells can use the preceding principles, but omit the mirror. These cells use a light source instead of ambient light. These types are called "back-lit."

Figure 2A:
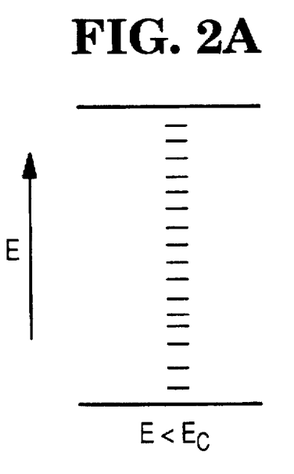
Figure 2B:
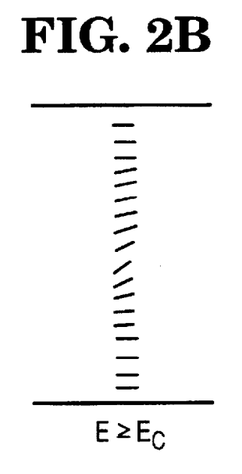
Figure 2C:
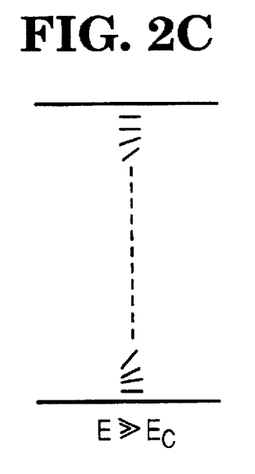
Figure 5:
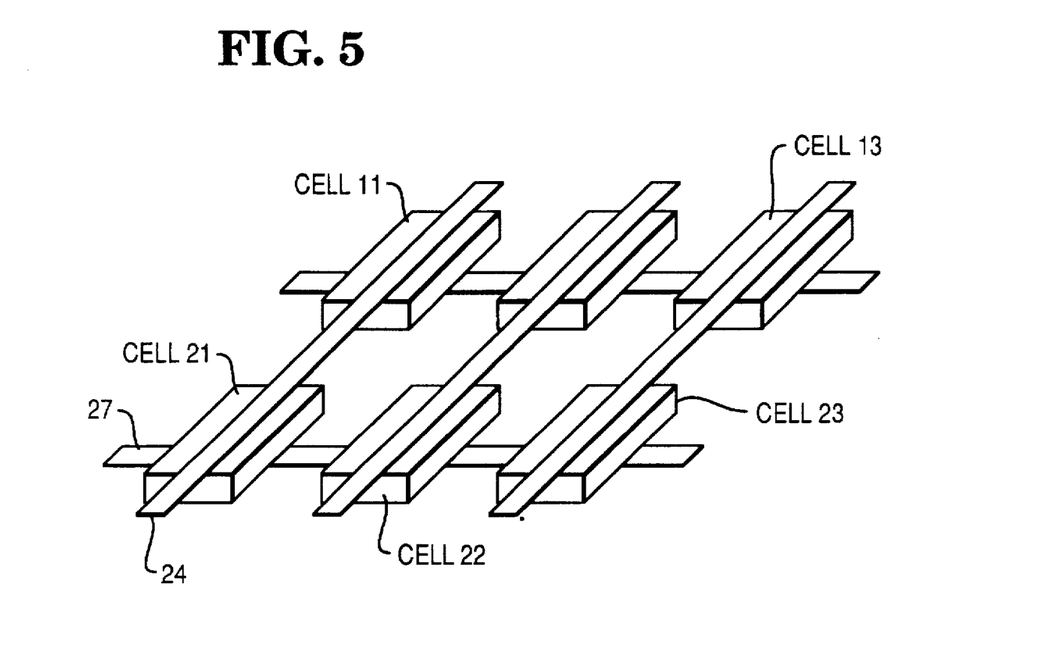
FIG. 5 illustrates part of a matrix of liquid crystal cells.

An actual LCD includes hundreds or thousands of such cells, arranged in a matrix array, as shown by the matrix in FIG. 5. When a high voltage is applied to line 24 and a low voltage is applied to line 27, an electric field, analogous to the field in FIG. 2, is placed across cell 21, and the cell behaves as indicated in FIG. 3B. The electric field causes the cell to appear dark.

Figure 6:
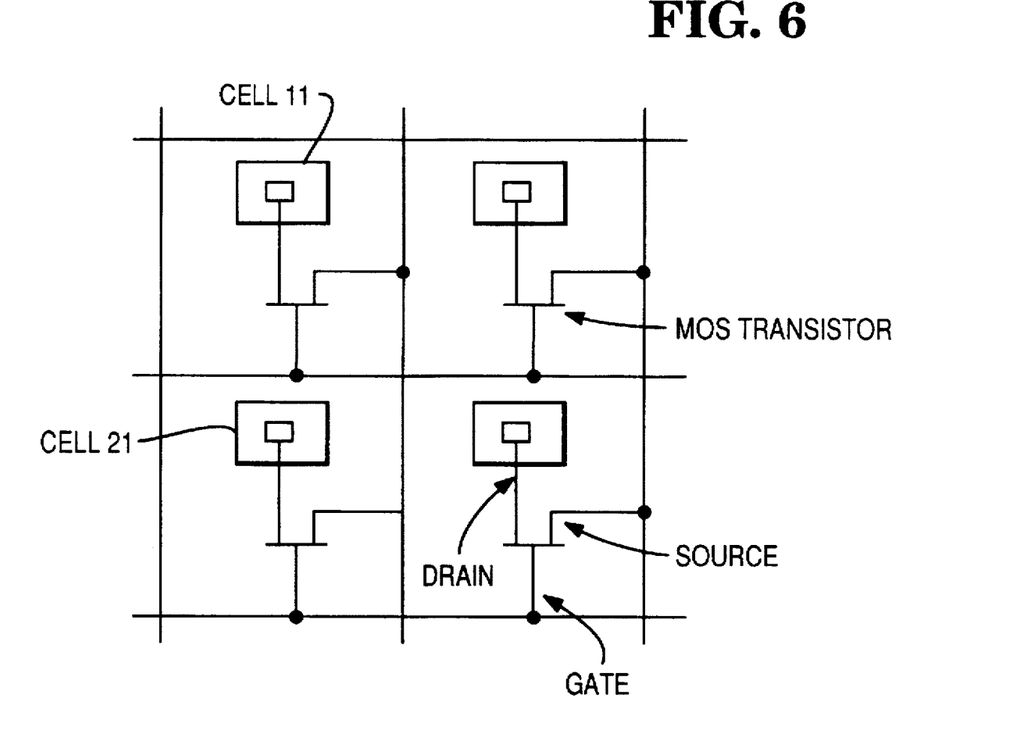
FIG. 6 illustrates an apparatus for controlling the electric field applied to each cell in the matrix of FIG. 5.
Figure 6A:
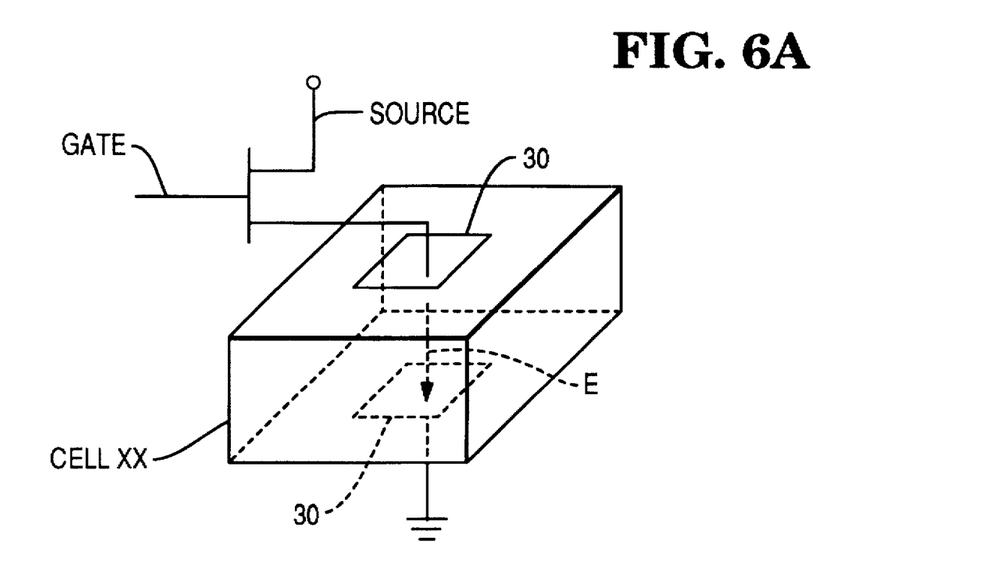
FIG. 6A shows how the MOS transistors in FIG. 6 apply charge to a capacitor whose plates 30 flank a liquid crystal cell.

One apparatus for applying the electric field is shown in FIG. 6. When a charge is applied to the gate of one (or more) MOS transistors, a current flows through the transistor and charges a capacitor, between whose plates 30 (shown in FIG. 6A) the liquid crystal lies. The charged plates apply an electric field E to the liquid crystal. The charge on the gate will eventually dissipate, but refreshing circuitry, known in the art, periodically replenishes the gate charge. A common refresh rate is in the range of 50 to 100 Hz.

Figure 7:
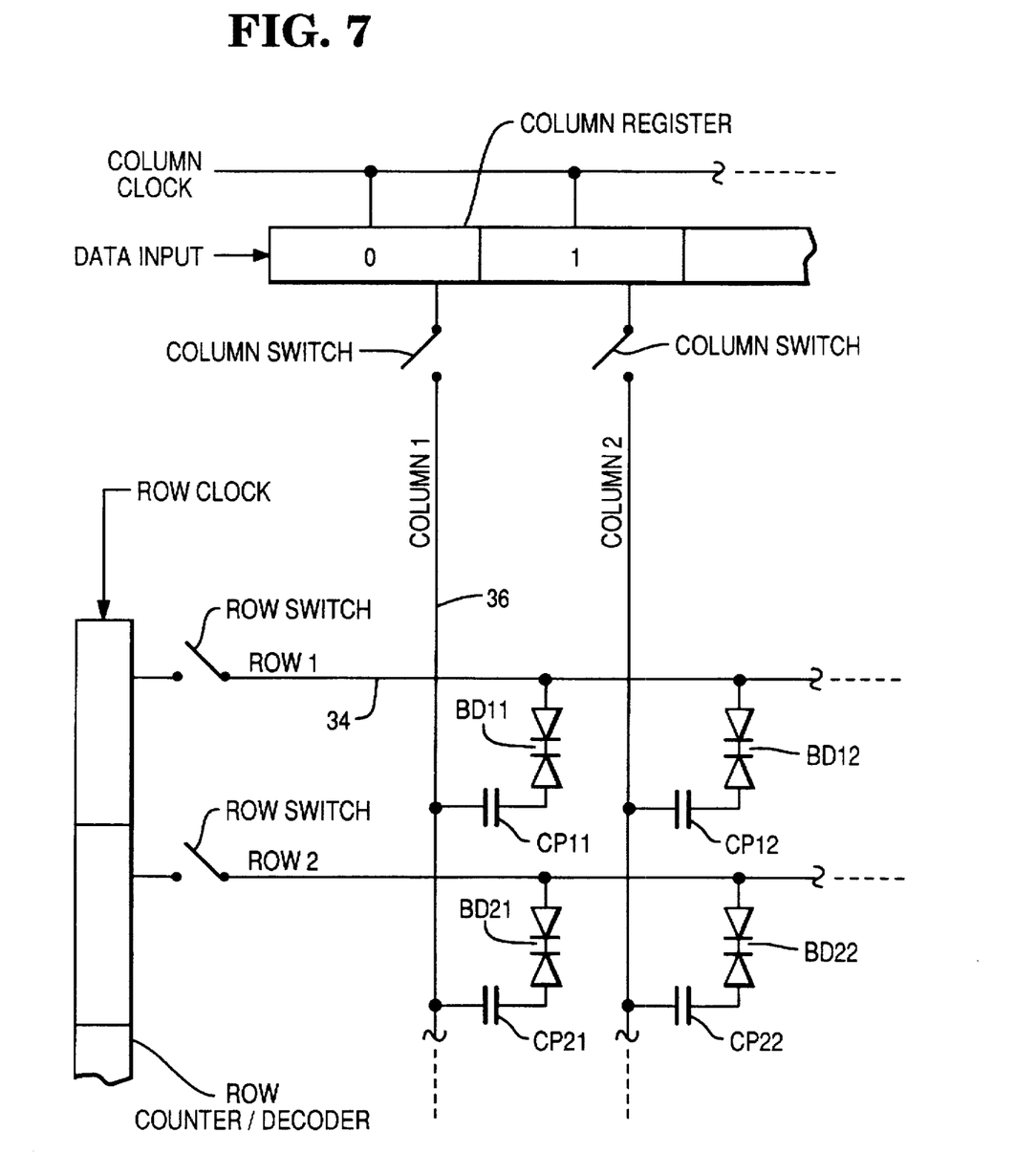
FIG. 7 illustrates another approach to applying charge to the capacitors.

Another apparatus for applying the electric field is shown in FIG. 7. A pair of diodes in series, but oppositely poled, such as BD11, charges each capacitor, such as CP11. When line 34 is at a high voltage and line 36 is at a low voltage, diode BD11 becomes conducting and charges the capacitor CP11.

(A pair of diodes is used, rather than a single diode, because the voltage on the capacitor must periodically be reversed in polarity. Otherwise, one plate of the capacitor will always be charged from zero to a positive voltage, and tend to permanently align the negative ends of the molecules in a fixed direction. The molecules would thus acquire a "memory," which is undesirable. Periodic reversal of the polarity of the field E prevents this permanent orientation, and the bi-lateral diodes allow the reversal.)

OBJECTS OF THE INVENTION

It is an object of the invention to provide an improved LCD display.

It is a further object of the invention to provide an LCD display which accepts data, in addition to displaying data.

SUMMARY OF THE INVENTION

In general, in a liquid crystal display, capacitors apply electric fields across respective pixels in the liquid crystal. In one form of the invention, the switching elements, such as diodes, which apply the charging currents to the capacitors, perform an additional function. They act as photodiodes. They receive light applied by an external light pen. The light induces charging currents into the capacitors. Sensing circuitry detects the charging currents, and stores data into video memory, which now indicates which pixels should be held dark. Thus, the light pen is able to "write" onto the display.

BRIEF DESCRIPTION OF THE DRAWINGS

FIGS. 2(A–C) illustrate how an applied electric field can reorient the molecules of a liquid crystal.

DETAILED DESCRIPTION OF THE INVENTION

One Form of Invention

FIGS. 8A–8D show one form of the invention. A glass sheet carries column address lines, which are controlled by column switches such as C1, C2, and C3, and row address lines, which are controlled by row addressing switches, such as R1, R2, and R3. A photodiode, such as PD11, PD12, etc., connects between each row and column crossing. The glass sheet is placed in registration with an LCD, such that the photodiodes are in registration with the pixels of the LCD.

In use, a control 45, known in the art, closes a single row switch, such as switch R1, thereby holding the first row line at a high voltage. Then the control pulls each column line to a low voltage, one-by-one, by successively closing the column switches, beginning with C1. In this manner, the control successively applies a voltage across each photodiode in the row. That is, the control scans the photodiodes.

During this scanning, the user positions a light pen 44, known in the art, at the location where the user wishes to draw a point. When the photodiode, such as PD11, at that location is scanned by the control, the photodiode conducts, causing a charging current I to flow, as in FIG. 8D, causing a voltage to appear across resistor $R_{s1}$. A differential amplifier SA1 senses the voltage, and stores a ONE in the column register 47 in FIG. 8B for the column containing the diodes.

After all columns have been scanned in the present row 1, the column register now contains data which identifies all columns which have been illuminated by the light pen. This data is transferred to the video memory, which illuminates (or darkens) the respective pixels in the row. Then, the column register is cleared, as known in the art, and the scanning process is repeated for the next row. That is, the control 45 opens R1 and closes R2, and all the columns are scanned, as above, to obtain the video data for row 2. This process is repeated until all rows have been scanned.

This scanning is done such that the entire matrix of photodiodes is scanned about every 10 or 20 milliseconds (ie. a rate of 50 to 100 Hz). This scanning rate is sufficiently fast that, if the user moves the light pen during scanning, the light pen will leave a trail of darkened pixels. That is, the video circuitry draws a visible line which follows the light pen. The system resembles a pen drawing on paper.

Second Form of Invention

Figure 9:
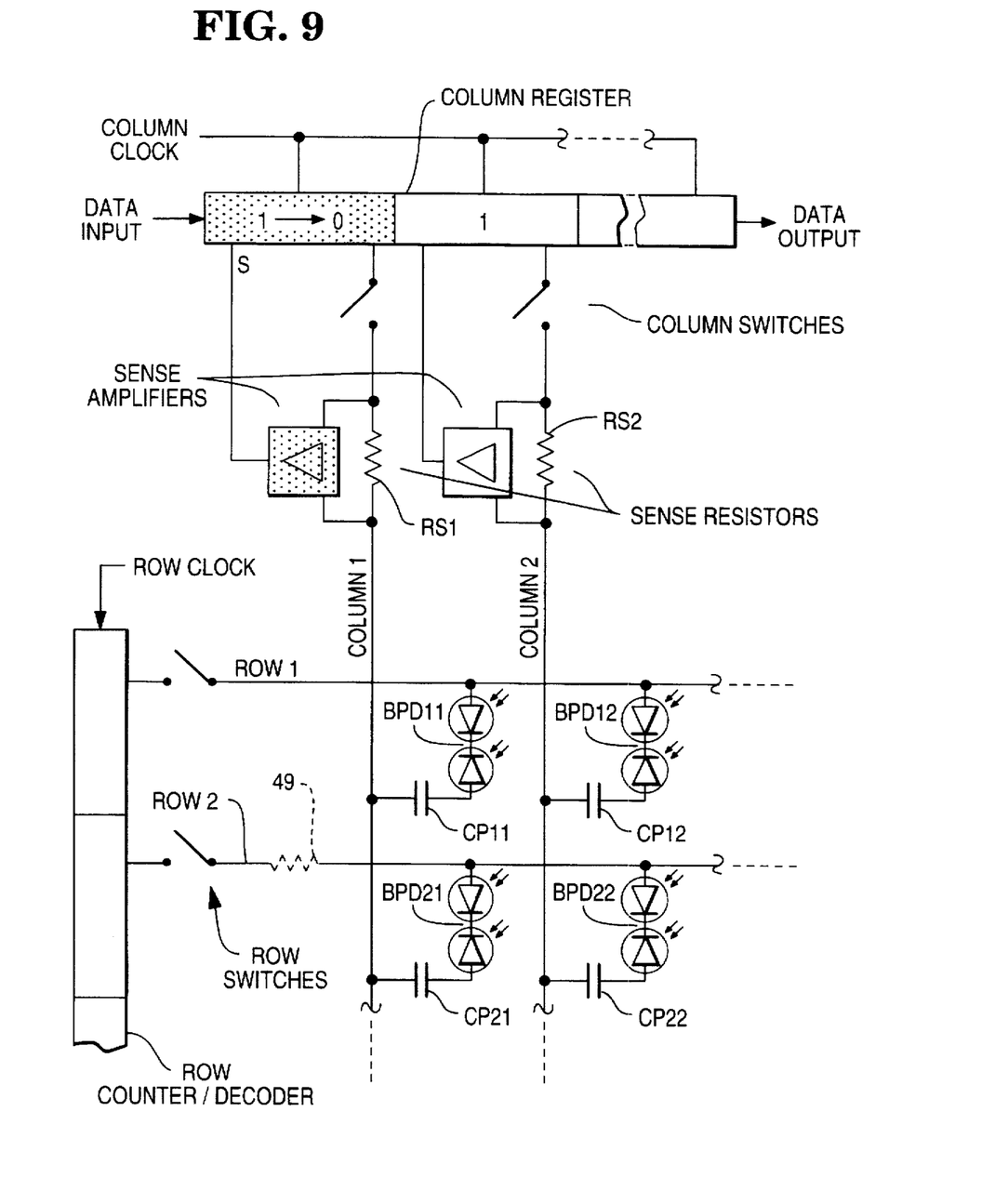
FIG. 9 illustrates a second form of the invention.

A more complex form of the invention is shown in FIG. 9. In this form, the diode matrix of the LCD itself, such as that shown in FIG. 7 and discussed in the Background, is used to accept the data from the light pen. For example, if the light pen is illuminating the bilateral photodiode BPD11, the photodiode will conduct, charging the capacitor CP11, and drawing a current through $R_{s1}$. A differential amplifier senses the voltage across $R_{s1}$ and loads a ONE into the column register for column 1. After the entire row is scanned, the data in the column register is transferred to the video memory, whereupon the pixel controlled by CP11 is darkened, as described in the simple form of the invention.

After the data is stored in video memory, the capacitors must be refreshed, because they will dissipate their charge. Refreshing is done by applying a higher voltage across the series connection of CP11 and BPD11, sufficient to drive BPD11 into conduction for charging CP11. (Previously, the light pen drove BPD11 into conduction.)

Thus, in the second form of the invention, two types of scanning cycles for the diodes are undertaken. One cycle is the data acquisition cycle, wherein data is acquired from the light pen 44: each illuminated photodiode (eg. BPD11) causes a signal to arise across the respective sense resistor (eg. $R_{s1}$) and cause data to ultimately be loaded into video memory.

The second cycle is the normal refresh cycle, which refreshes the pixels, based on the data in the video memory. During the second cycle, the voltage difference between the row and column lines is caused to be greater than in the first, and, possibly, of opposite polarity, for reasons discussed above.

Of course, as the following paragraph makes clear, it is not necessary that two distinct scanning steps be used; a single scanning step, which both refreshes and collects data from the light pen, can be used.

Assume that a given pixel is to be held dark, according to the data in video memory. Thus, during refresh, the pixel's capacitor (eg, CP11 in FIG. 8B or 8D is to be charged. The charging will cause a current through the capacitor's sense resistor (eg, RS1). The sense amplifier now believes that the light pen is calling for that pixel to be darkened, even though video memory, not the light pen, is calling for the darkening.

This error is not significant, because it does not matter whether the video memory or the light pen is requesting a dark pixel. The video memory only makes such a request if the light pen previously requested the pixel to be dark. Either way, a ONE is held in the video memory for the pixel in question.

It is noted that the sense resistors can be placed in the row lines, as is phantom resistor 49 in FIG. 9, instead of in the column lines. This type of connection can provide better isolation from the capacitors. That is, it may not be desirable to have the resistors, such as $R_{s1}$, connected simultaneously to multiple capacitors, such as CP11 and CP21.

FIG. 9 shows two photodiodes in each bilateral photodiode, such as BPD11. In actuality, these photodiodes can take the form of a phototransistor having the base lead eliminated. The emitter-base junction forms one diode, and the collector-base junction form the other diode. When light is applied to the base, it generates carriers, which act like a base current, and can drive the transistor into saturation.

Alternate Embodiment

Figures 8, 8C:
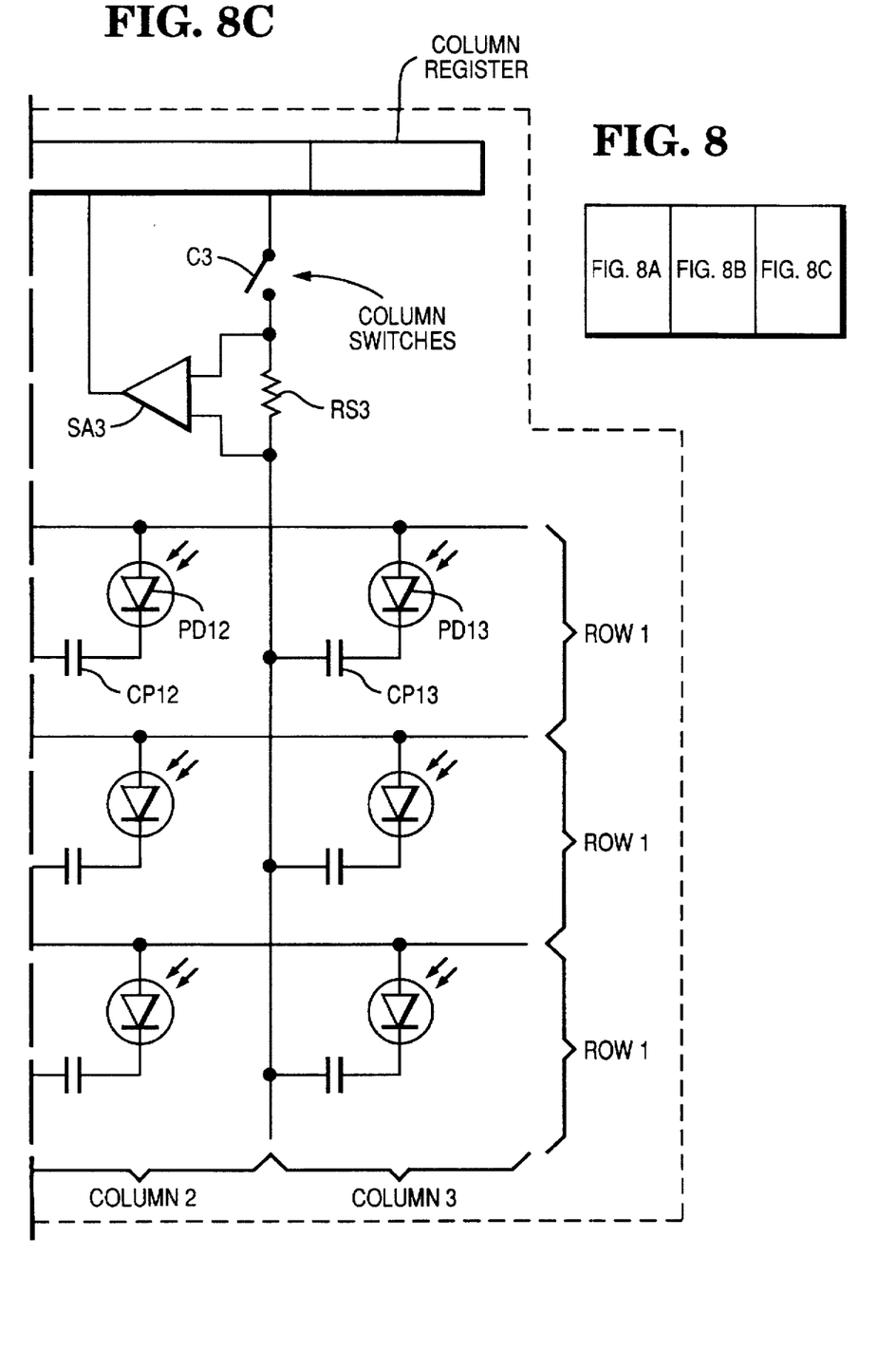
FIGS. 8, 8A illustrates one form of the invention.
FIGS. 8B and 8C illustrate more detail of the invention shown in FIG. 8A.
Figure 8A:
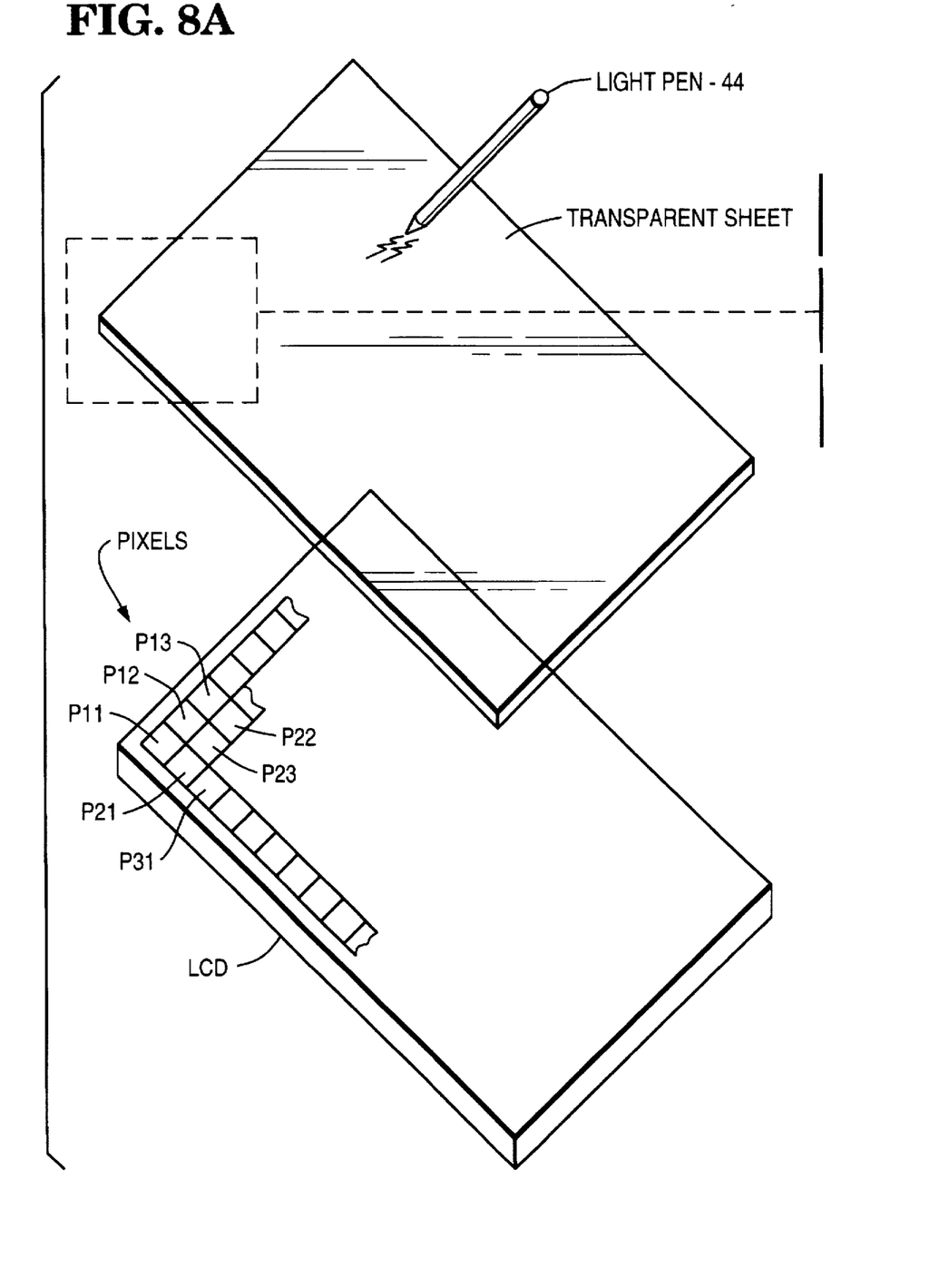
Figure 8B:
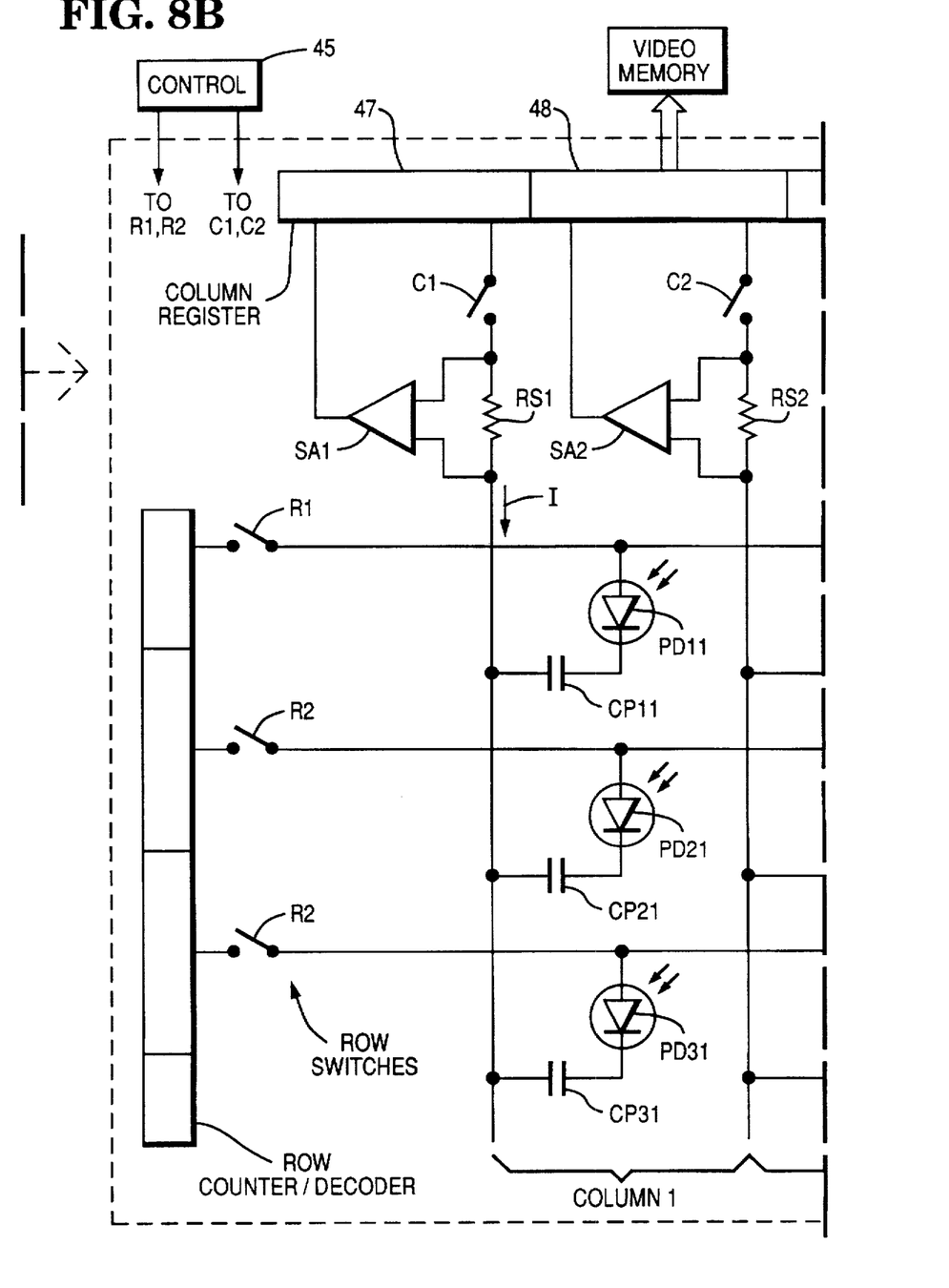
Figure 8D:
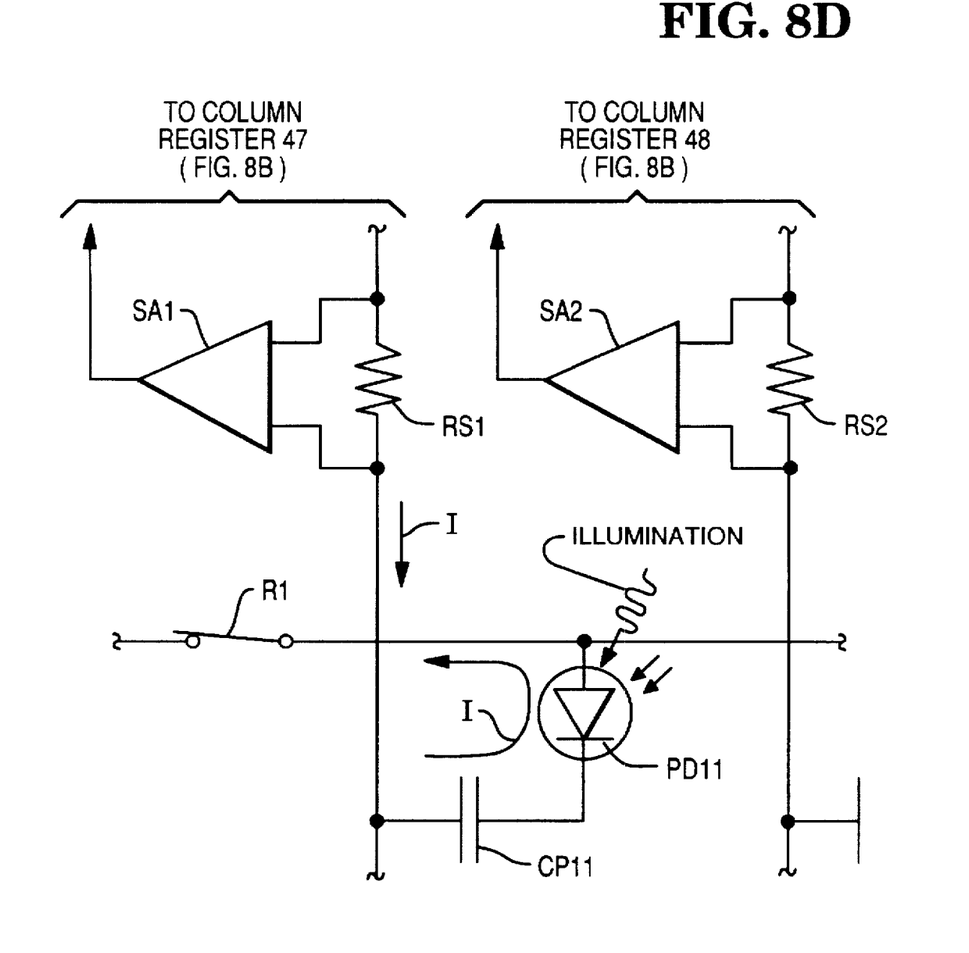
FIG. 8D illustrates an enlarged portion of FIG. 8.
Figure 10:
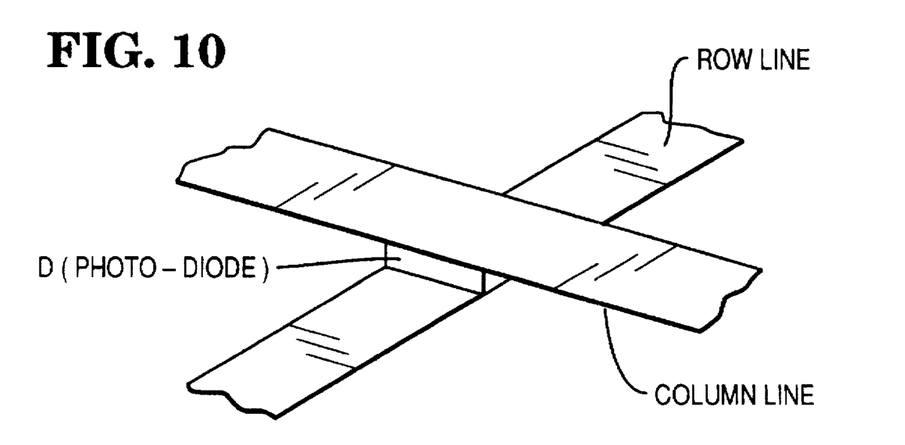
FIG. 10 illustrates an alternate embodiment.

If, as shown in FIG. 8, the pen-position-scanning-mechanism is located on a third sheet, a capacitor to be charged is not necessarily required. The photosensitive diode itself is sufficient. However, in this case, the row and column lines must be isolated from each other, at least at the crossing points. One way to isolate them, which is preferable from a manufacturing perspective, is shown in FIG. 10. The photosensitive diode D is located exactly at the crossing point of the ROW- and COLUMN LINES, perpendicular to the ROW- and COLUMN lines (that is, perpendicular from the point of view of the current path). The diode acts as an insulator when non-actuated, and acts as a connector in the activated case.

Numerous substitutions and modifications can be undertaken without departing from the true spirit and scope of the invention. What is desired to be secured by Letters Patent is the Invention as defined in the following claims.

I claim:

1. In a liquid crystal display having a plurality of pixels, the improvement comprising:
   a) a light pen for producing incoming light;
   b) a plurality of sensors, each
      i) associated with a respective pixel and
      ii) capable of producing a signal in response to incoming light; and
   c) means for changing the brightness of each pixel, in response to the signal for that pixel.

2. Apparatus according to claims 1, and further comprising means for storing data indicative of the respective signals, and for maintaining the respective pixels in the changed states of brightness.

3. Apparatus according to claim 1, in which the means for changing the brightness of each pixel produces a change in brightness which is non-temporary.

4. A method of operating a liquid crystal display, in which capacitors apply electric fields to selected regions of the liquid crystal, comprising the following steps:
   a) delivering charge to selected capacitors by means of a light pen;
   b) sensing the delivery of charge to the capacitors and, in response,
   c) storing data which identifies the charged capacitors.

5. The method according to claim 4 and further comprising the step of delivering charge to selected capacitors by illumination of photosensors connected to said capacitors.

6. A method of operating a liquid crystal display, in which capacitors in an array are charged in order to apply electric fields to selected regions in the display, comprising the following steps:
   a) charging selected capacitors by using a light pen;
   b) sensing the charging of the selected capacitors; and
   c) recording the identities of the charged capacitors.

7. In a liquid crystal display having a plurality of capacitors, each of which applies an electric field to a respective pixel, the improvement comprising:
   at least one photodiode connected to each capacitor, and able, in normal operation, to deliver charge to the capacitor in response to both applied voltage and illumination applied by a light pen.

8. Apparatus according to claim 7 and further comprising sensing means for sensing the delivery of charge to each capacitor, and producing signals in response.

9. A visual display, comprising:
   a) liquid crystal media;
   b) one or more capacitance means for applying electric fields to the media at different locations; and
   c) switching means for
      i) allowing a user equipped with a light pen to charge selected capacitance means; and
      ii) delivering charge to capacitance means in response to applied voltage.

10. Apparatus according to claim 9 and further comprising
    d) sensing means for sensing the charge delivery; and
    e) storage means for storing data identifying the capacitances receiving the charge.

11. An apparatus in using with a liquid crystal display having a plurality of capacitors, each of which applies an electric field to a respective pixel, said apparatus comprising:
    a) at least one photodiode connected to each capacitor, and in normal operation,
       i) able to deliver charge to the capacitor in response to applied voltage, without illumination, and
       ii) able to deliver charge to the capacitor in response to illumination applied by a light pen.

* * * * *